(12) United States Patent
Malki et al.

(10) Patent No.: US 7,596,463 B2
(45) Date of Patent: Sep. 29, 2009

(54) METHOD AND STORAGE MEDIUM FOR CALIBRATING A HOLOGRAPHIC STORAGE SYSTEM

(75) Inventors: Oliver Malki, VS-Pfaffenweiler (DE); Frank Przygodda, Villingen-Schwenningen (DE); Thomas Schmidt-Uhlig, Gleichen (DE)

(73) Assignee: Thomson Licensing, Boulogne-Billancourt (FR)

( * ) Notice: Subject to any disclaimer, the term of this patent is extended or adjusted under 35 U.S.C. 154(b) by 66 days.

(21) Appl. No.: 12/075,569

(22) Filed: Mar. 12, 2008

(65) Prior Publication Data

US 2008/0225671 A1 Sep. 18, 2008

(30) Foreign Application Priority Data

Mar. 15, 2007 (EP) .................................. 07104247

(51) Int. Cl.
*G11B 7/00* (2006.01)
(52) U.S. Cl. ............................... 702/85; 359/1; 369/103
(58) Field of Classification Search .................. 702/85; 359/1, 22, 23, 35, 900, 3; 369/103
See application file for complete search history.

(56) References Cited

U.S. PATENT DOCUMENTS

| 5,920,536 A | 7/1999 | Campbell et al. |
| 2005/0185233 A1 | 8/2005 | Baba et al. |
| 2006/0215527 A1 | 9/2006 | Uchida et al. |

OTHER PUBLICATIONS

European Search Report dated Jul. 19, 2007.

*Primary Examiner*—Drew A Dunn
*Assistant Examiner*—Hien X Vo
(74) *Attorney, Agent, or Firm*—Robert D. Shedd; Jeffrey M. Navon

(57) ABSTRACT

The present invention relates to a method for calibrating a holographic storage system, and to an apparatus for reading from and/or writing to holographic storage media and a holographic storage medium suitable for such method. According to the invention, the method has the steps of:
  sending a set of test data pages through at least part of the holographic storage system;
  receiving a set of transmitted test data pages with a detector;
  comparing the set of transmitted test data pages with the set of sent test data pages; and
  correcting parameter variations of the holographic storage system based on the results of the comparing step.

8 Claims, 3 Drawing Sheets

METHOD AND STORAGE MEDIUM FOR CALIBRATING A HOLOGRAPHIC STORAGE SYSTEM

This application claims the benefit, under 35U.S.C. § 119 of European Patent Application 07104247.7, filed Mar. 15, 2007.

FIELD OF THE INVENTION

The present invention relates to a method for calibrating a holographic storage system, and to an apparatus for reading from and/or writing to holographic storage media and a holographic storage medium suitable for such method.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array.

For any holographic data storage system it is essential to be robust against undesired variations of the system parameters, both during the reading and the writing process. Such variations result of, for example, temperature changes or differing properties of the used components of different systems. Especially variations in the setup of the light source, which typically is a laser diode, the spatial light modulator and the detector need to be controlled and minimized for a well working system. For example, even small changes of the wavelength of the readout reference beam compared to the recording reference beam (also known as wavelength mismatch) lead to significant distortions of the readout data page. Due to the variations the dependency of the detector pixel values on the SLM pixel values may have a different characteristic for each pixel of the detector. As a result the detector image can be non-uniform in image contrast and intensity. This reduced image quality can in turn increase the symbol error rate.

A further aspect that needs consideration is the interchangeability, i.e. using a holographic storage medium with different holographic data storage systems. Interchangeability has to be ensured for a market acceptance of holographic data storage. Slight and maybe unforeseen differences of the properties of the holographic storage media should be compensated by the holographic data storage system.

To cope with the above problems a calibration of a holographic storage system is necessary. For example, a fixed calibration can be determined during the manufacturing process. Alternatively, highly advanced components with negligible tolerances can be used.

In EP 0 201 274 a holographic storage system is described, in which a readout calibration is implemented. During recording calibration pixels with predetermined grey values are recorded on a holographic storage medium. During read-out these reference patterns are evaluated for normalizing the pixel intensity. The calibration pixels are provided for compensating for variations caused by superimposed additional holograms on the storage medium and are recorded in each data page.

The document U.S. Pat. No. 5,920,536 discloses a holographic storage system using page marks for obtaining a quality measure during readout. Based on this quality measure geometrical or optical parameters are varied. The resulting quality is measured as a calibration feedback.

The document WO 2005/103842 discloses a holographic storage medium having calibration features. Special indicators are provided at specified positions on the storage medium. These indicators provide information about the storage medium for adjusting the holographic storage system to the storage medium.

SUMMARY OF THE INVENTION

It is an object of the invention to propose an improved method for calibrating a holographic storage system. According to the invention, this object is achieved by a method for calibrating a holographic storage system, having the steps of:
  sending a set of test data pages through at least part of the holographic storage system;
  receiving a set of transmitted test data pages with a detector;
  comparing the set of transmitted test data pages with the set of sent test data pages; and
  correcting parameter variations of the holographic storage system based on the results of the comparing step.

The invention enables to automatically calibrate undesired variations of the system parameters. For this purpose a set of test data pages is sent through the entire system or through the reading path of the system. The transmitted set of data pages is analyzed with the detector. During this analysis the sent data pages are compared with the acquired data pages to determine the characteristic of the holographic storage system. With this method the holographic data storage system can be calibrated against intensity variations that are caused by temperature differences, different holographic media or varying mechanical, electronic or optical properties of the used components from one storage system to another. During the calibrations procedure the holographic storage system is calibrated. Later this calibration is used to reduce or eliminate errors caused by the variations. An advantage of the invention is that the individual system components themselves are used to calibrate unavoidable variations of the holographic storage system. This leads to an individual and system specific calibration. In addition, there might be unforeseen variations between different samples of holographic storage media. These differences cannot be calibrated during the manufacturing process. The calibration method according to the invention includes the storage medium.

Advantageously, the method is performed at start-up of the holographic storage system and/or before a reading and/or writing operation. By calibrating each system individually before any reading or writing process higher tolerances of the system components can be handled. However, in order to allow a faster access to recorded data, and to reduce the time before a writing operation is started, it is likewise possible to perform the calibration automatically only at the start-up of the system. Further alternatives are to perform the calibration at regular intervals or whenever the system is idle.

Preferably, in the comparing step a characteristic curve is determined for each pixel of the detector. It has been found that the system parameter variations have different effects on different parts of the data pages. Therefore, the calibration method is further improved when each detector pixel is individually calibrated.

Favorably, the set of test data pages is sent through the holographic storage system by a spatial light modulator. The spatial light modulator used for recording data pages is preferably used for this purpose. This solution is especially suitable for a holographic storage system capable of recording. By sending the set of test data pages through the holographic storage system with the spatial light modulator the complete holographic storage system is calibrated.

When the spatial light modulator is used for calibrating the holographic storage system, a neutral part of a holographic storage medium where no data are stored is preferably illuminated during the sending step. This has the advantage that the calibration is not influenced by any data recorded on the holographic storage medium. Alternatively, the calibration can also be performed without a holographic storage medium located in the holographic storage system. In this case, however, the influence of the holographic storage medium on the system parameters is not corrected.

Alternatively, the set of test data pages is sent through the holographic storage system by illuminating test data pages recorded on a holographic storage medium with a reference beam. Though this approach is especially suitable for a read-only holographic storage system, it is likewise favorable for a holographic storage system capable of recording. According to this approach test pages are located on the holographic storage medium. When these test pages are illuminated by the reference beam, the reconstructed test pages are transmitted through the reading path of the holographic storage system. Therefore, in this case only the reading path is calibrated. This is in any case sufficient if only reading is to be performed.

Advantageously, the set of test data pages includes a plurality of test data pages each having a single grey value, which varies from page to page. This allows to determine a characteristic sensitivity curve for each pixel, i.e. the dependency of the detector pixel value on the SLM pixel value or the pixel value of the data page.

Alternatively or additionally, the set of test data pages includes at least a test data page with a pixel pattern for detecting a wavelength mismatch between a light beam used for recording and a light beam used for reading. It has been found that a wavelength mismatch during readout leads to a smearing of the image of each pixel of a recorded data page over a plurality of pixels of the detector array. This smearing depends on the amount of the wavelength mismatch and can hence be considered a measure of the wavelength mismatch. An optimum compensation of the wavelength mismatch is achieved when the smearing is minimized.

Though in the above description the invention is described with reference to a holographic storage system, the method is applicable to any page oriented storage system.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
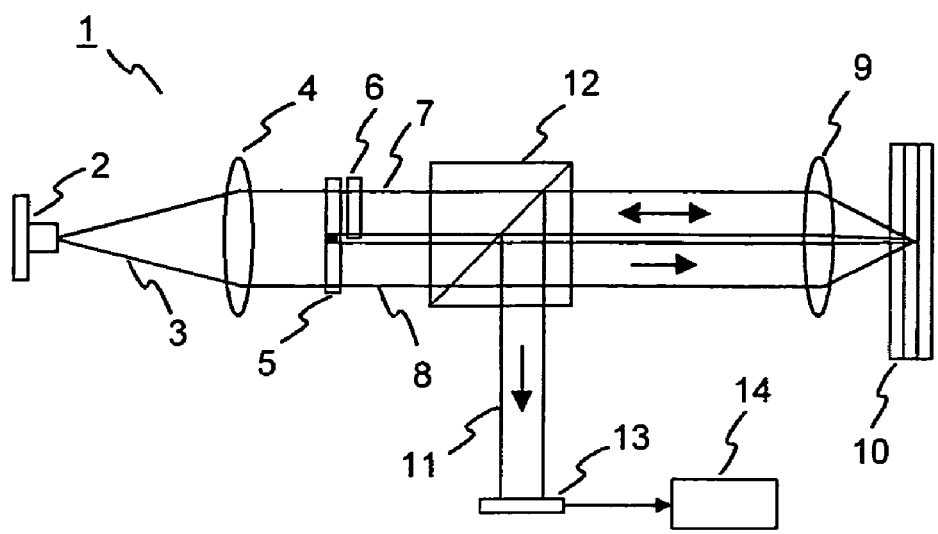
FIG. 1 schematically depicts a holographic storage system according to the invention.

In holographic data storage digital data are stored by recording the interference pattern produced by the superposition of two coherent laser beams. An exemplary holographic storage system 1 according to the invention is shown in FIG. 1. A source of coherent light, e.g. a laser diode 2, emits a light beam 3, which is collimated by a collimating lens 4. The light beam 3 is then divided into two separate light beams 7, 8. In the example the division of the light beam 3 is achieved using a first beam splitter 5. However, it is likewise possible to use other optical components for this purpose. A spatial light modulator (SLM) 6 modulates one of the two beams, the so called "object beam" 7, to imprint a 2-dimensional data pattern. Both the object beam 7 and the further beam, the so called "reference beam" 8, are focused into a holographic storage medium 10, e.g. a holographic disk or card, by an objective lens 9. At the intersection of the object beam 7 and the reference beam 8 an interference pattern appears, which is recorded in a photo-sensitive layer of the holographic storage medium 10.

The stored data are retrieved from the holographic storage medium 10 by illuminating a recorded hologram with the reference beam 8 only. The reference beam 8 is diffracted by the hologram structure and produces a copy of the original object beam 7, the reconstructed object beam 11. This reconstructed object beam 11 is collimated by the objective lens 9 and directed onto a 2-dimensional array detector 13, e.g. a CCD-array, by a second beam splitter 12. The array detector 13 allows to reconstruct the recorded data. A calibration system 14 analyzes the images obtained by the array detector in order to correct parameter variations of the holographic storage system 1.

As described above, a holographic data storage system 1 generally uses a spatial light modulator 6 to produce data pages, which are stored via interference of an object beam 7 and a reference beam 8 in a holographic storage medium 10. During reading the reference beam 8 illuminates a recorded hologram and reconstructs the data page, which is detected via a matrix detector 13. The optical system consists, inter alia, of lenses 4, 9, mirrors or beam splitters 5, 12, and apertures. All these components show certain tolerances. In addition, their properties are dependent on the influence of external parameters, e.g. the temperature. This means that two holographic storage systems, even if they consist of the same components, are not perfectly equal. In other words, their data channels are different. This means that intensity variations are likely to occur in the reconstructed data pages, which need to be compensated.

Figure 2:
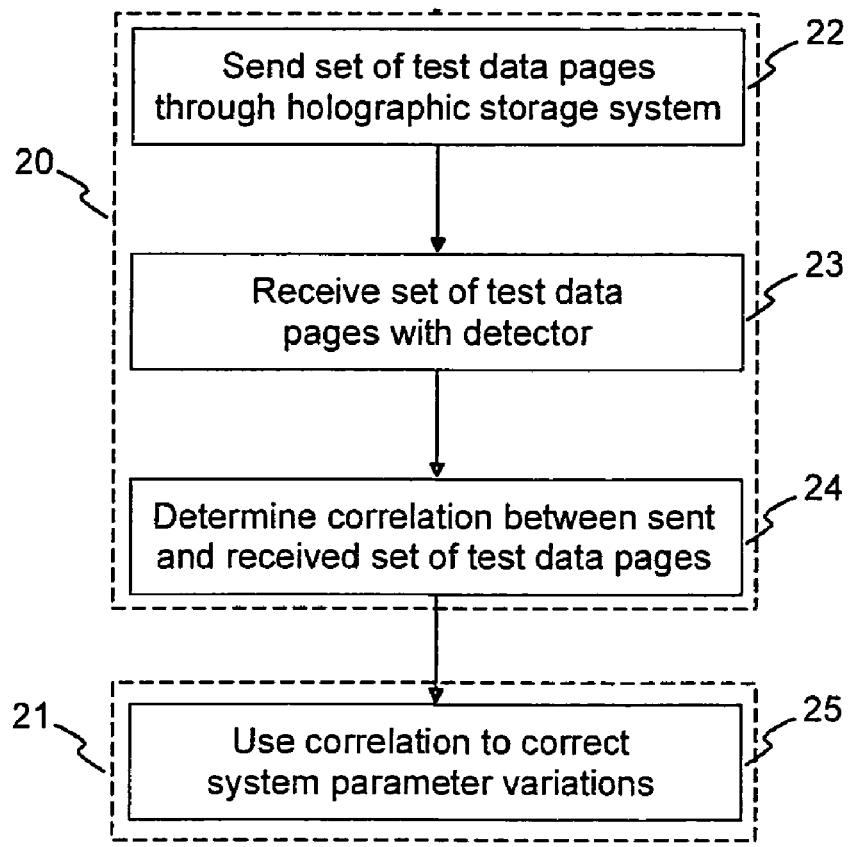
FIG. 2 depicts two operation modes of a holographic storage system according to the invention.

To compensate for the above differences in the data channel, a holographic storage system 1 according to the invention has at least two operation modes 20, 21. These operation modes are depicted schematically in FIGS. 2 and 3. The first operation mode 20 is a calibration mode, in which a calibration procedure is performed, whereas the second operation mode 21 is a reading or writing mode. At startup of the holographic storage system 1 and/or before a reading or writing operation, a set 14 of test data pages 15 is sent 22 through the holographic storage system 1, or more specifically through its data channel 16, by the SLM 6. In other words, the SLM 6 illuminates the holographic storage medium 10 with a set 14 of test data pages 15, which are reflected—in case of a reflection type holographic system 1—or transmitted—in case of a transmission type holographic system 1—by the holographic storage medium 10 towards the detector 13. The sent set 14 of test data pages 15 is received 23 by the detector 13. Subsequently the correlation between the sent and the received set 14 of test data pages 15 is determined 24. In the reading or writing mode 21 this correlation is used 25 to correct or reduce errors resulting from undesired system parameter variations.

Figure 3:
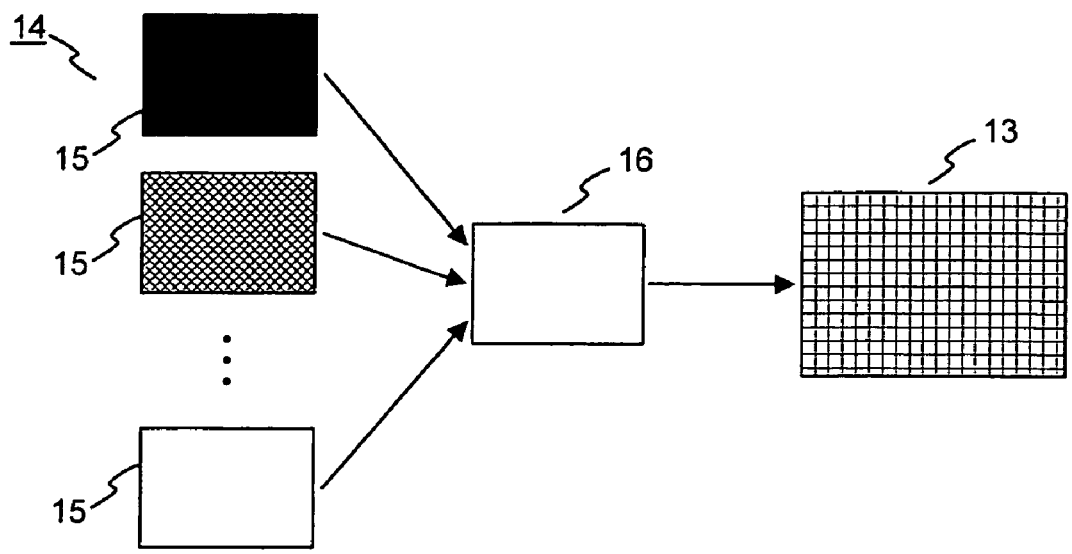
FIG. 3 illustrates a calibration procedure according to the invention.
Figure 4:
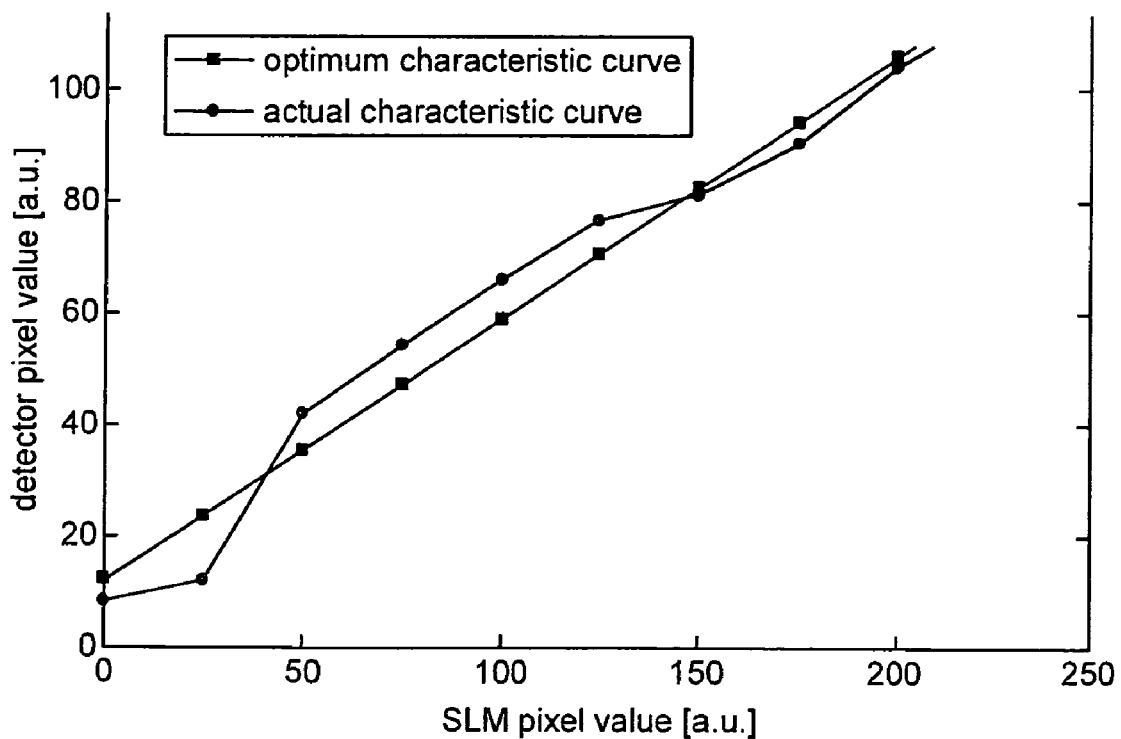
FIG. 4 shows the characteristic curve for one single pixel.

Advantageously the set 14 of test data pages 15 consists of pages 15 having a single grey value each, as schematically shown in FIG. 3. Through the set 14 of test data pages 15 the grey values varies from dark, i.e. the SLM pixel value 'zero', to maximum illumination, i.e. the SLM pixel value 'one'. Such a set 14 allows to determine the characteristic curve of the entire system 16. The characteristic curve delivers the dependency of the detector pixel values on the SLM pixel values. As an example the characteristic curve for one single pixel is illustrated in FIG. 4. Compared with the optimum characteristic curve, i.e. a linear relation between the detector pixel values and the SLM pixel values, the actual characteristic curve is influenced by the characteristic curves of the SLM 6, the detector 13 and the optical path. In the operation mode 21 this curve is taken into account. This is achieved by correcting the detected image via numerical calculations. Alternatively, optical and electronic parameters of the setup can be controlled. For example, significant differences in offset and gain of the detector 13 occur, especially when a CMOS detector is used. Likewise, the SLM 6 and/or the beam profile might not be perfectly uniform. These differences can be calibrated individually for each holographic data storage system under varying operation conditions. Of course, it is likewise possible to combine both types of corrections, e.g. by numerically correcting those deviations which cannot be completely corrected by controlling the optical and electronic parameters.

Figure 5:
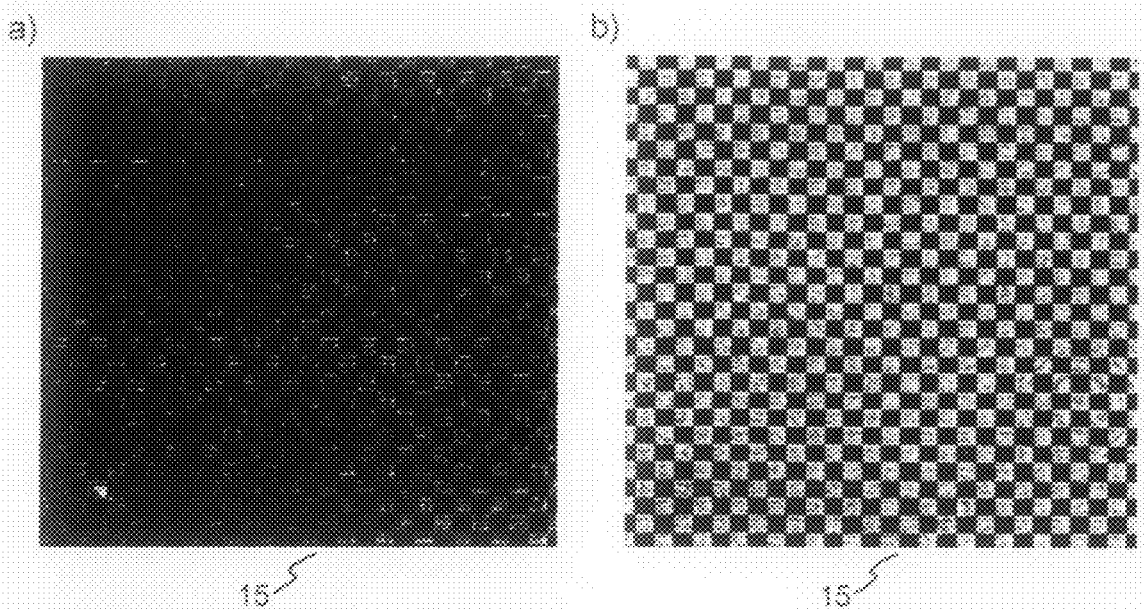
FIG. 5 depicts a comparison of a non-corrected detector image and a corrected detector image.

A comparison of a non-corrected detector image and a corrected detector image is shown in FIG. 5. Each pixel in FIG. 5b) was obtained by correcting the corresponding pixel of the original detector image in FIG. 5a) via linear regression using the calibration.

Preferably a neutral part of the holographic medium 10, i.e. an area where no data are stored, is used during the calibration procedure. Alternatively, the calibration procedure is performed without a holographic storage medium 10 located in the holographic storage system 1. The latter solution is only feasible for a transmission type holographic storage system 1. A further solution is to use special test data pages 15 included on the holographic storage medium 10. These test data pages are retrieved by illuminating the holographic storage medium 10 with the reference beam 8.

Figure 6:
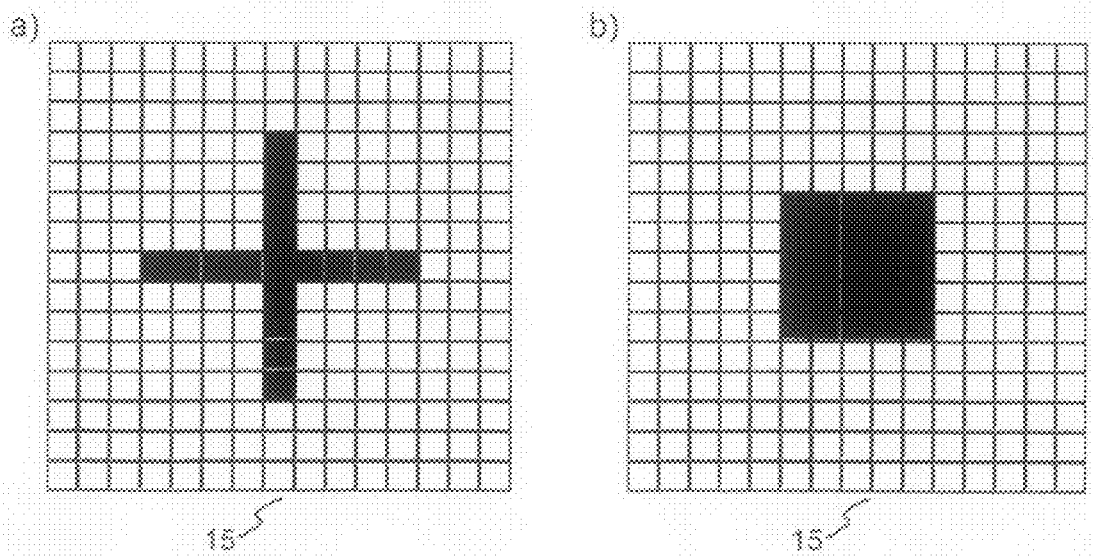
FIG. 6 illustrates two different data pages suitable for wavelength mismatch determination.

In FIG. 6 two exemplary test data pages 15 provided on the holographic storage medium are shown. These test data pages are especially suitable for detecting a wavelength mismatch between a light beam 7, 8 used for recording and a light beam 8 used for reading. It has been found that a wavelength mismatch during readout leads to a smearing of the image of each pixel of a recorded data page over a plurality of pixels of the detector array 13. This smearing depends on the amount of the wavelength mismatch and is hence a measure of the wavelength mismatch. An optimum compensation of the wavelength mismatch is achieved when the smearing is minimized. However, as the data patterns of normal data pages are irregular, it is quite difficult, if not impossible, to analyze the smearing using the detector image of a reconstructed normal data page. In order to cope with this problem, during each recording session or at least in regular or irregular intervals a predefined data page 15 is recorded on the holographic storage medium 10. As the data pattern of this data page 15 is known, it can be used to analyze the wavelength mismatch. Apart from the illustrated examples, other data patterns may be used, e.g. a circle, a plurality of equally or differently spaced elements, a plurality of stripes etc. As it is known which pixels on the array detector 13 should be bright and which pixels should be dark, during readout a wavelength mismatch compensation can be varied until the readout data pattern best fits the expected data pattern. Alternatively, a plurality of experimentally predetermined smeared data patterns are stored in a memory of the holographic storage system 1 together with the underlying wavelength mismatch. By comparing the detected data page with the stored data pages, the wavelength mismatch can likewise be determined and corrected.

Though in FIG. 6 a complete data page 15 is used for the calibration, it is likewise possible to reserve a special area of the normal data pages for the calibration pattern, similar to the known alignment patterns used for aligning the array detector 13 to the readout data page.

The invention claimed is:

1. Method for calibrating a holographic storage system, having the steps of:
   sending a set of test data pages through at least part of the holographic storage system;
   receiving a set of transmitted test data pages with a detector;
   comparing the set of transmitted test data pages with the set of sent test data pages; and
   correcting parameter variations of the holographic storage system based on the results of the comparing step, wherein during the sending step either no holographic storage medium is located in the holographic storage system or a neutral part of a holographic storage medium where no data are stored is illuminated by an object beam only.

2. Method according to claim 1, wherein the method is performed at start-up of the holographic storage system and/or before a reading and/or writing operation.

3. Method according to claim 1, wherein in the comparing step a characteristic curve is determined for each pixel of the detector.

4. Method according to claim 1, wherein the set of test data pages is sent through the holographic storage system by a spatial light modulator.

5. Method according to claim 1, further having the steps of:
locating a further set of test data pages arranged on a holographic storage medium in the beam path of a reference beam of the holographic storage system; and
sending the further set of test data pages through the holographic storage system by illuminating test data pages recorded on a holographic storage medium with the reference beam.

6. Method according to claim 1, wherein the set of test data pages includes a plurality of test data pages each having a single grey value.

7. Method according to claim 5, wherein the set of test data pages includes at least a test data page with a pixel pattern for detecting a wavelength mismatch between a light beam used for recording and a light-beam used for reading.

8. Method according to claim 7, wherein the step of comparing the set of transmitted test data pages with the set of sent test data pages includes detecting a smearing of the test data pages on the detector.

* * * * *